FIG. 8 FIG. 9 FIG. 10
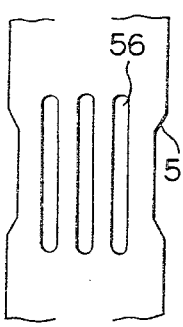
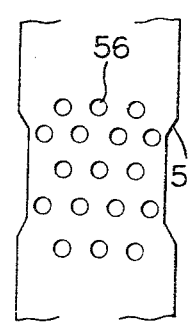
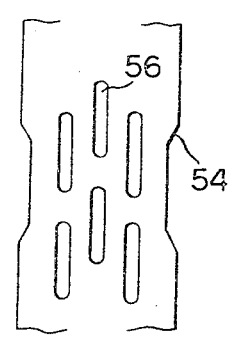
FIG. 11 FIG. 12 FIG. 13
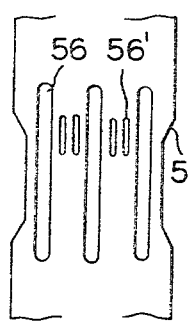
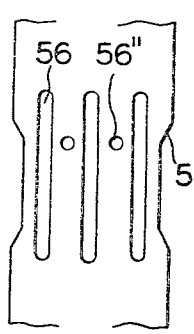
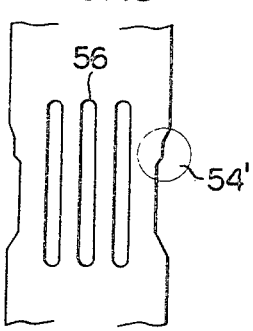
FIG. 14 FIG. 15
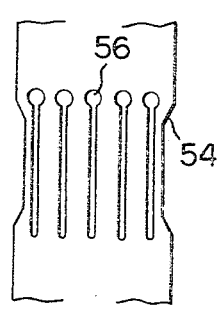
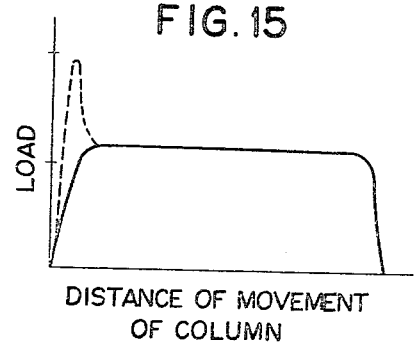

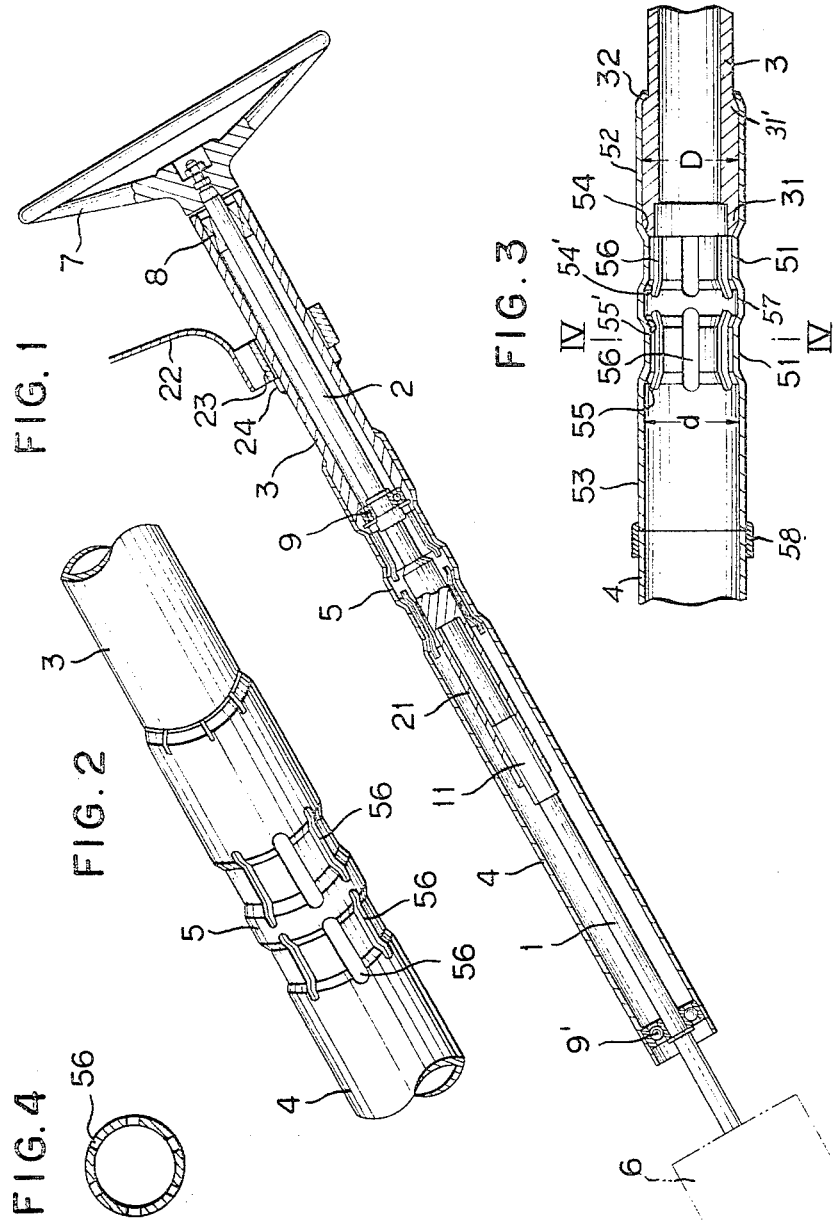

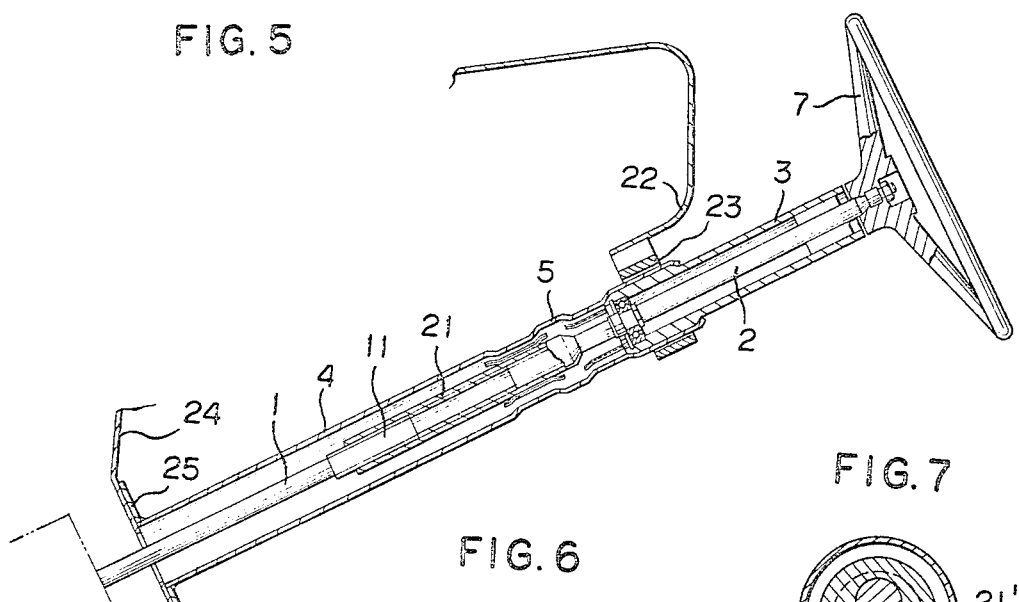
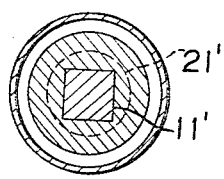
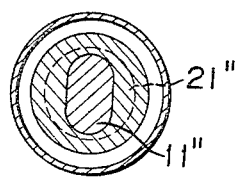

United States Patent Office  3,479,902
Patented Nov. 25, 1969

3,479,902
SAFETY STEERING ASSEMBLY
Kenjiro Okamoto, Fujisawa-shi, Japan, assignor to Nippon Seiko Kabushiki Kaisha, Tokyo, Japan, a corporation of Japan
Filed Sept. 25, 1967, Ser. No. 670,148
Claims priority, application Japan, Nov. 10, 1966, 41/73,475
Int. Cl. B62d 1/18
U.S. Cl. 74—492     7 Claims

ABSTRACT OF THE DISCLOSURE

A collapsible, impact-absorbing steering assembly is desirable for safety reasons. In this invention, a telescopic steering shaft is mounted within a two-piece steering column, one piece being fitted within the other. An impact-absorbing section is located in one column adjacent the butting end of the other column, and comprises at least one reduced-diameter section having a plurality of slots or holes therein. On impact of the vehicle, the shafts telescope and one column is forced over the other while at the same time plastically deforming. Such deformation and friction between the columns absorb impact energy.

---

This invention relates to a safety steering assembly for an automobile.

The danger of injury or death to the driver of an automobile presented by the steering wheel and/or steering shaft is well known. The present invention provides a steering assembly having a steering shaft which is collapsible in the axial direction. Further, shock absorber means are provided on a column surrounding the steering shaft which, during collapse of said shaft, produces a resistance to collapse as it elastically and plastically deforms. This resistance, together with a frictional resistance between the shock absorber means and the steering shaft, absorb a substantial amount of the impact force which, in the absence thereof, would be transmitted undiminished to the driver.

A safety steering shaft has been proposed in U.S. Patent 3,262,332, issued to Robert D. Wight on July 26, 1966. However, such devices require complicated additional equipment for achieving their purpose, and are very expensive.

An object of the present invention is, therefore, to provide a simple and cheap safety steering shaft for automobiles.

The main feature of the present invention resides in the safety steering shaft for an automobile comprising a lower steering shaft connectable to the steering gear box, and an upper steering shaft connected to the lower shaft by a spline, and a two-piece steering column rotatably retaining the steering shaft therein, and consisting of an upper column and a lower column. Between the upper and lower steering columns there is provided an impact absorbing section. The impact absorbing section may be integral with one or the other steering columns, or may be a separate piece; in either event it comprises a hollow cylinder connected to the steering columns and having one or more transverse sections of reduced diameter connected to the main cylindrical portion with tapered shoulder sections. The reduced diameter sections and the shoulder sections are provided with a plurality of slots or holes which weaken the impact absorbing section structurally. On impact, the reduced diameter sections plastically deform and frictionally engage the upper column, absorbing a substantial amount of the impact energy.

The above and other objects and features of the invention will be more apparent from the following description of the embodiments shown in the drawings, in which:

FIG. 1 is a cross-sectional elevation of an embodiment of the invention mounted on the instrument panel of an automobile;

FIG. 2 is a perspective view of the impact-absorbing section;

FIG. 3 is a cross-sectional elevation of the impact absorbing section with the steering shaft removed;

FIG. 4 is a transverse section along the line IV—IV of FIG. 3;

FIG. 5 is a view similar to FIG. 1 showing an embodiment of the invention mounted on the instrument panel and fire board of an automobile;

FIG. 6 is a cross-section of another embodiment of the transmission mechanism in which the rotational force is transmitted through a coupling having a square cross section;

FIG. 7 is yet another embodiment of the mechanism of FIG. 6;

FIGS. 8 through 14 show various configurations of slots and holes which can be used in the impact-absorbing section; and FIG. 15 is a curve showing the relation between the distance of movement of the column and the load working thereon.

The basic elements of the invention are a lower steering shaft 1, an upper steering shaft 2, an upper steering column 3, a lower steering column 4, and an impact-absorbing section 5, shown in FIGS. 1 and 2 as being integral with lower column 4 and in FIG. 3 as a separate section. Lower shaft 1 is connected to a steering gear 6 and upper shaft 2 is connected to steering wheel 7.

Rotation of steering wheel 7 is transmitted to the steering gear box 6 by means of the gearing on spline shaft 11 and the spline boss 21. Shafts 1 and 2 can thus telescopically collapse over their whole length in the axial direction; spline shaft 11 merely slides into the inside of the spline boss 21. The length of the spline boss 21 is sufficient for this purpose.

Steering columns 3 and 4 rotatable retain steering shafts 1 and 2 therein with bearings 9 and 9', and sleeve bushing 8.

Impact-absorbing section 5 is a cylinder having two reduced diameter portions 51, and a number of holes or slots 56 which extend in the axial direction. Tapered shoulders 54, 54' and 55, 55' connect the reduced diameter portions 51, the end portions 52 and 53 and intermediate portion 57. At the end of the end portion 52, the upper column 3 is inserted, and the other end portion 53 is connected to the lower column 4, integrally in FIGS. 1 and 2, and by means of welded seam 58 in FIG. 3. The internal diameter $d$ of the end portions 52 and 53, is made a little larger than the external diameter $D$ of the upper column 3, and the end portion 52 and the upper column 3 are so prepared that they can be lightly fitted against each other.

Upper column 3 is inserted inside impact-absorbing section 5, and when the tapered end surface 31 of upper column 3 is butted against shoulder 54, the inwardly-bent axial collar 32 snaps over shoulder 31' on column 3, and the upper column 3 is thus connected to the lower column 4.

The shape, size, number and position of the holes 56 and the reduced-diameter portions 51 are related to the diameter, overall length and thickness of impact absorbing section 5, and they are determined so that the impact absorbing section has a rigidity suitable for the steering shaft used, but can still absorb impact energy by plastic deformation and friction.

The assembly of the embodiment shown in FIG. 1 is supported on the instrument panel 22 of the automobile by a support bracket 23, which is mounted around a portion of the upper column 3. An annular collar or flange 24 is secured to the external surface of upper column 3 adjacent and to the left of bracket 23, so that it prevents column 3 from moving upwardly (to the right) but permits column 3 to slidably move within bracket 23 downwardly (to the left).

FIG. 5 shows the same assembly as shown in FIG. 1, but in which the supporting means is different. In this case, the end portion 52 of the impact absorbing section 5 is slidably or fixedly supported by the instrument panel through the aid of a support bracket, and the lower end of lower column 4 is fixed to the fire wall through a flange plate 25.

As has been explained before, the lower steering shaft is connected to the upper steering shaft with the aid of spline tube 11 and spline boss 21. As shown in FIGS. 6 and 7, such connecting means may be modified in various ways. In FIG. 6, the spline shaft is replaced by a square rod 11' and the spline boss is replaced by a boss 21' having a square cross section accommodating the square rod. In FIG. 7, the spline shaft is replaced by a shaft 11" having an oblong cross section and the spline boss is replaced by a boss 21" having a cross section accommodating the cross section of the shaft 11".

FIG. 8 through FIG. 14 show various forms of holes by developing a part of the impact absorbing section 5; only one reduced-diameter portion 51 is shown.

FIG. 8 shows the basic embodiment as shown in FIGS. 2–4. FIG. 9 shows an embodiment in which a number of round holes are provided, and in the neighborhood of the shoulder 54, the interval between holes in the axial direction is made narrower. FIG. 10 shows an embodiment in which long holes are arranged in a number of rows, and the density of holes is increased in the neighborhood of the shoulder 54. FIG. 11 shows an embodiment in which small slots 56' are provided in the place of shoulder 54. FIG. 12 shows an embodiment in which round holes 56" are provided in place of the small slots 56' of FIG. 11. FIG. 13 shows an embodiment in which shoulder 54 of FIG. 8 is modified to provide a two-stage shouler 54'. FIG. 14 shows an embodiment in which the ends of slots 56 of FIG. 8 are enlarged to holes near shoulder 54, providing a general key-hole configuration.

These embodiments are all designed to eliminate the initial resistance to plastic deformation by lowering the rigidity in the neighborhood of shoulder 54, where the plastic deformation initiates.

As noted above, rotation of steering wheel 7 is transmitted to gear box 6 through spline 11, boss 21 and steering shafts 1 and 2, or by the alternative arrangements disclosed. On impact, steering shaft 1 telescopes into shaft 2, thus protecting the driver from being impaled on or injured by shaft 2. At the same time, shoulder 54 of impact absorbing section 5 is forced against and over surface 31 of column 3, initiating the deformation and frictional engagement which absorbs impact energy. In particular, plastic deformation initiates at the various shoulders, while at the same time impact absorbing section is forced onto upper column 3, friction being generated by the reduced-diameter sections.

Thus, resistance caused by spring effect of impact absorbing section 5, the frictional resistance between the internal peripheral surface of reduced-diameter portions 51 and the external peripheral surface of the upper column 3, and the resistance caused by plastic deformation of section 5 as it moves over upper column 3, can be represented on the vertical axis of the curve of FIG. 15. This shows the relation between the distance of the movement of the column and the load. Impact energy is attenuated by these resistances and little or no shock is given to the driver.

The entire impact energy should be absorbed by a lesser load and longer moving distance, as shown in the solid line. When the shape, size or number of the holes 56, or the angle of the shoulder 54 is improper, the load at the initial stage of the movement of the column will be increased as shown by a dotted line in FIG. 15. This must carefully be avoided. To do this, the internal diameter $d$ of the end portions 52 and 53 of impact-absorbing section 5 is made slightly larger than the external diameter $D$ of the upper column 3, and the upper column 3 is lightly fitted to the end portion 52; frictional resistance between the internal peripheral surface of end portion 52 and the external peripheral surface of upper column 3, when plastic deformation is brought about, is thus reduced. The increase of the load at the initial stage of the movement, as shown by the dotted line in FIG. 15, is prevented by facing the shoulder 54 to the end surface 31 of the upper column 3, or by making shoulder 54 in two stages, or by drilling additional holes in the neighborhood of the shoulder.

In the present invention, friction force is utilized, in particular, and it is possible to make use of the longer moving distance of the column for absorbing the shock, i.e., to make use of the longer time required for the column to absorb shock, and thereby it is possible to diminish the energy transmitted to the driver.

The structure of the steering shaft assembly of the present invention is simple, and therefore it can be produced economically.

In the embodiments of FIGS. 1, 2 and 5, the impact absorbing section 5 is integral with lower column 4 and in FIG. 3 it is a separate section welded to lower column 4. However, impact absorbing section 5 can be made integral with the lower end of upper column 3, and the upper end portion of lower column 4 can be inserted within the end portion 52 of section 5. Similarly, the spline shaft 11 is illustrated on the lower steering shaft 1, with spline boss 21 on the upper steering shaft 2, but the opposite arrangement would have the same effect. Various other changes in the details, steps materials and arrangements of parts can be made by those skilled in the art within the principle and scope of the invention as defined in the appended claims and their equivalents.

What is claimed is:

1. A safety steering assembly for an automobile comprising:
   a lower steering shaft connected to a steering gear of the automobile;
   an upper steering shaft connected to a steering wheel;
   means for slidably fitting one of the steering shafts within the other of the steering shafts for transmission of rotational force from one shaft to the other;
   upper and lower steering columns retaining said steering shafts therein;
   an energy absorbing member between said upper and lower columns comprising a cylinder having at least one reduced diameter portion connected to said cylinder by shoulders and containing a plurality of openings, one of said columns being fitted within said energy absorbing member.

2. A safety steering assembly according to claim 1, wherein the internal peripheral surface of the reduced diameter portion has a smaller diameter than the outside diameter of the column fitted within the energy absorbing member, so as to be expanded by said other column when impact energy forces said absorbing member over said other column.

3. A safety steering assembly according to claim 1, wherein the end portion of the column fitted within said energy absorbing member abuts one of said shoulders connecting the cylindrical end portion and the reduced diameter portion of said energy absorbing member.

4. A safety steering assembly according to claim 1, wherein said upper column is supported by the automobile body slidably in the lower direction.

5. A safety steering assembly according to claim 1, wherein the lower end portion of said lower column is fixed to the fire wall of the automobile, and the upper portion of the lower column is mounted to the instrument panel of the automobile.

6. A safety steering assembly for an automobile comprising:
- a pair of steering shafts, one shaft being telescopable into the other shaft and adapted for transmission of rotational force from a steering wheel fixed on one end of one shaft to a steering gear fixed on the opposing end of the other shaft;
- a pair of coaxial steering columns retaining said shafts therein and adapted for mounting within said automobile, the end of one of said columns being fitted within the end of the other of said columns;
- an impact-absorbing section in the other of said columns adjacent the end of the one of said columns, said impact-absorbing section comprising at least one reduced diameter portion connected to said column by tapered shoulders and containing a plurality of openings.

7. A safety steering assembly according to claim 6, wherein the end of said one column fitted into said other columns abuts a shoulder in said impact absorbing section.

References Cited
UNITED STATES PATENTS

| | | | |
|---|---|---|---|
| 3,373,629 | 3/1968 | Wight et al. | 74—492 |
| 3,394,612 | 7/1968 | Bososoff et al. | 74—492 |

MILTON KAUFMAN, Primary Examiner

U.S. Cl. X.R.

188—1